Feb. 5, 1946. W. FARRELL 2,394,296
ELECTRIC MACHINE
Filed Feb. 25, 1944 2 Sheets-Sheet 1

Inventor
William Farrell
by Joshua R H Patt
His Attorney.

Feb. 5, 1946.  W. FARRELL  2,394,296

ELECTRIC MACHINE

Filed Feb. 25, 1944  2 Sheets-Sheet 2

Inventor
William Farrell
by Joshua R H Potts
His Attorney.

Patented Feb. 5, 1946

2,394,296

UNITED STATES PATENT OFFICE 2,394,296

ELECTRIC MACHINE

William Farrell, Philadelphia, Pa.

Application February 25, 1944, Serial No. 523,807

5 Claims. (Cl. 172—36)

This invention relates to an electric machine or engine and the object of the invention is to provide such a machine in which one or more electric motors are mounted in a rotating body to increase the heft of said body as a fly wheel or rotor and permit the same to be driven more steadily and uniformly by a small or light electric motor to develop the full capacity of the motor.

Another object is to improve the material capacity of electric motors compared to other mountings and driving mechanisms employed in electric machines or engines, and to develop the same to full efficiency and fitness for certain uses, particularly in connection or combination with a novel arrangement of gear trains for stepping up the driving effect and the external connection or coupling thereof to a driven unit, such as in driving a generator, compared to producing electric current by wind, water or steam.

A further object is to provide an improvement upon the device shown in my prior Patents Nos. 931,743 dated August 24, 1909, and 1,610,666 dated December 14, 1926, and particularly as to the driving arrangement or gearing employing auxiliary driving or countershafts, so that the driving effect at both or opposite sides is rendered uniform instead of uneven, and so that one side will not tend to run ahead or lag behind the other with resultant increase in friction, torque, binding or loss of power and efficiency, thereby enabling the machine to run more smoothly and evenly with more efficient results.

Further objects and advantages will appear and be brought out more fully in the following specification, reference being had to the accompanying drawings, in which.

Figures 1, 2:
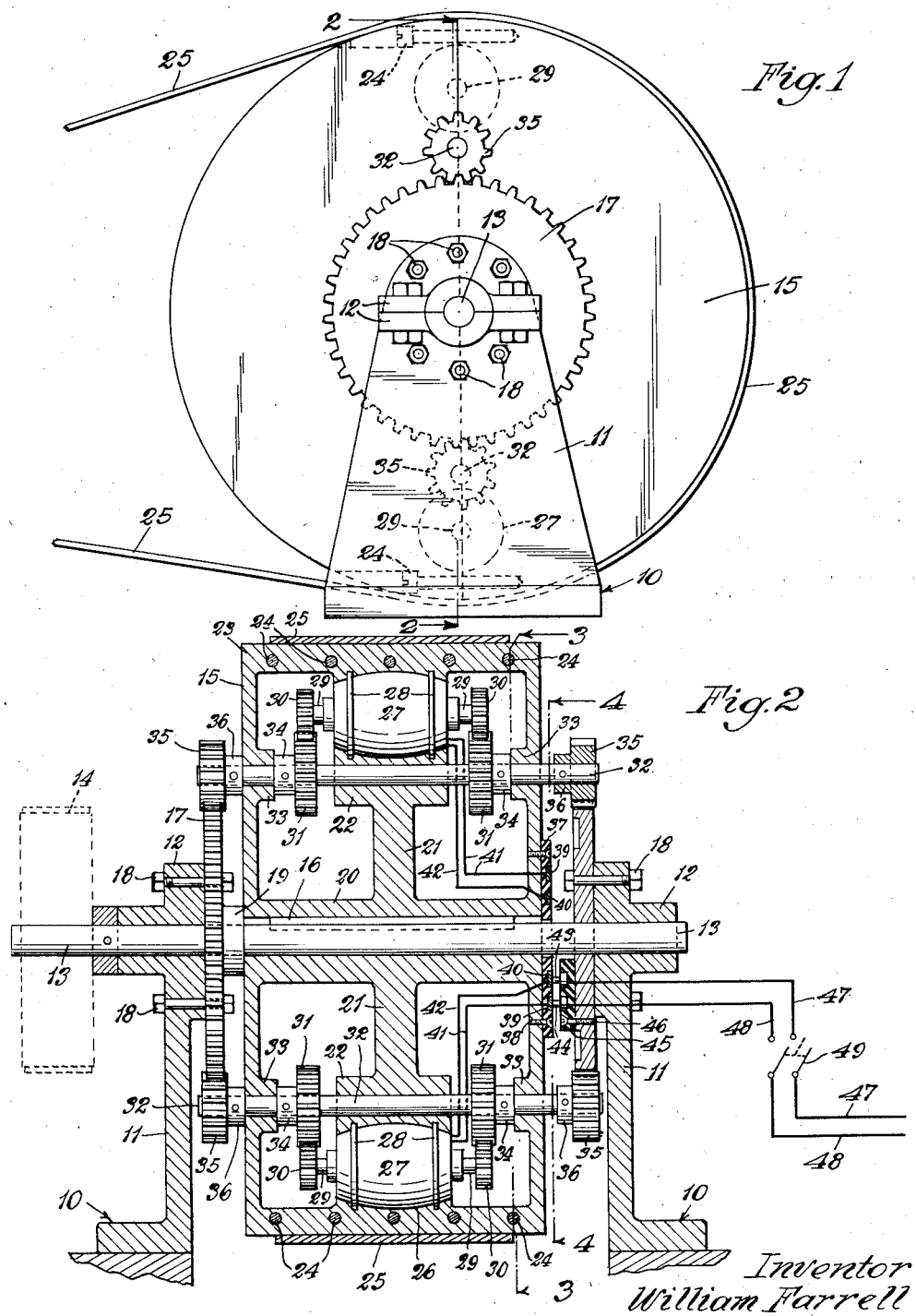
Fig. 1 is a side elevation of an electric machine or engine constructed in accordance with my invention.
Fig. 2 is a sectional view thereof taken on the line 2—2 of Fig. 1.
Figure 3:
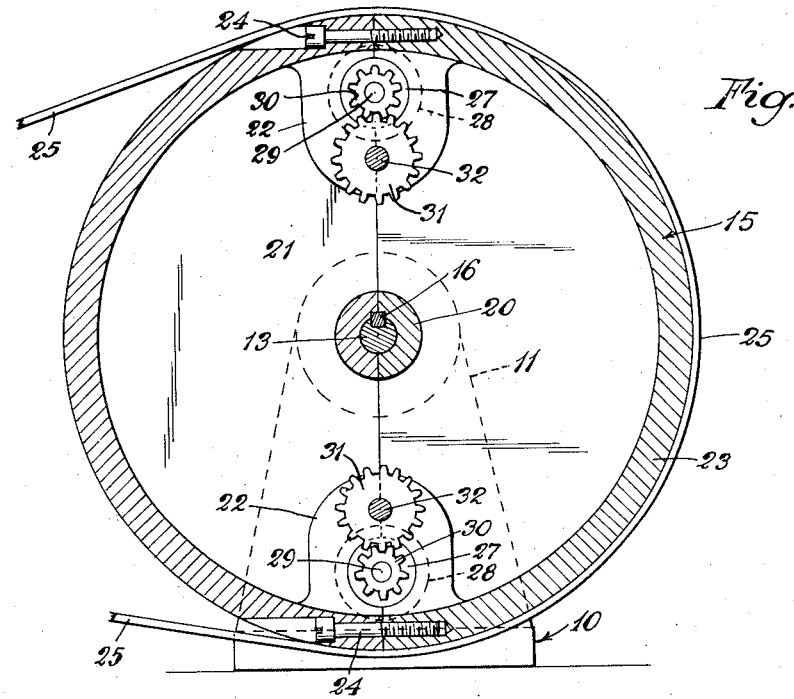
Fig. 3 is a sectional view taken on the line 3—3 of Fig. 2.
Figure 4:
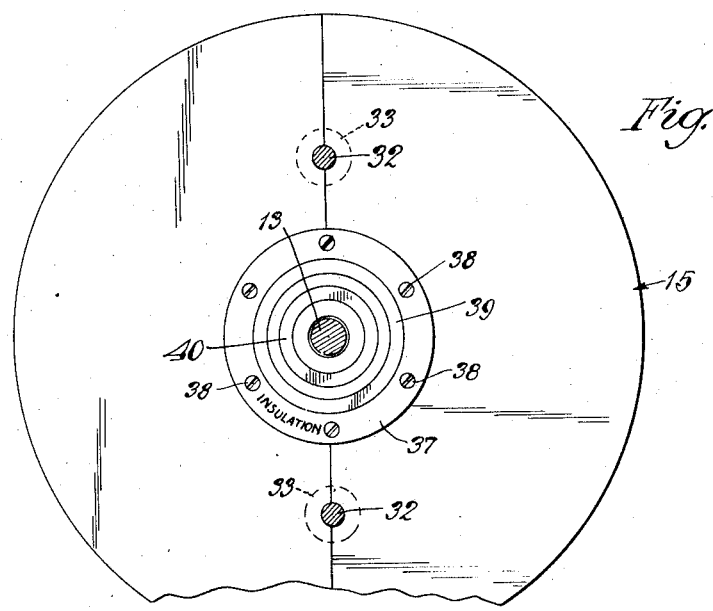
Fig. 4 is a sectional view taken on the line 4—4 of Fig. 2.

Referring more particularly to the drawings in detail, 10 designates a frame having spaced sides 11 with bearings 12 designed to rotatably support a horizontal shaft 13 suitably held from end thrust and to which a pulley 14 may be fixed at one end to receive a belt for taking off power from the shaft, although any other suitable means may be provided for this purpose. A hollow cylindrical body or casing 15 is hung on the bearings of the frame and may be fixed or keyed to the shaft 13 as indicated at 16 to rotate between the sides of the frame. Large gears 17 are stationarily mounted on the frame and may be bolted as indicated at 18 to the inside of the sides 11 thereof around the bearings 12. One of the gears may have its hub 19 projecting inwardly to engage one side of the body 15 which is in the form of a hollow cylindrical casing or shell. The body 15 is formed with an axial bearing sleeve or hub 20 by which it is mounted on and keyed to the shaft 13 by a suitable spline or groove and keyed or otherwise fixed thereto. Extending from the sleeve or hub 20 is a radial web 21 having enlarged outer portions 22 connected to peripheral wall 23 of the body which is formed in two sections of semi-cylindrical form, connected as by screws or bolts 24. The revoluble body 15 may take a belt 25 by which power may be taken off the machine in lieu of the pulley 14 for transmission to a suitable mechanism to be driven such as a dynamo, machinery, or otherwise.

The enlarged outer portion 22 of the web 21 is provided with one or more, preferably a plurality of cavities 26 in which electric motors 27 are mounted and fixed in any suitable way as indicated at 28 such as by means of bolts or collars and the armature of each motor has a shaft 29 projecting in opposite directions on which wheels or pinions 30 are fixed to mesh with larger wheels or pinions 31 fixed or keyed to transverse shafts 32 rotatably supported in bearings formed in the enlarged web portions 22 and bearings 33 in the sides of the rotatable body 15. Suitable spacing collars 34 may be provided on the shafts to take up end thrust at the bearings and the ends of the shaft project outwardly of the sides of the body 15 to mount wheels or pinions 35 with intermediate spacing collars 36 and which mesh with the stationary tracks or gear wheels 17 so as to revolve about the same. It should be noted that the motors and their shafts are all equidistantly spaced from the axis of rotation formed by the shaft 13 and thus are concentric thereto as are the shafts 32 and gears fixed thereon so that parts will rotate in unison without undue friction. In the space provided between the side walls of the body 15 or the cylindrical casing or shell forming the same, the hub 19 projects inwardly at one side and at the other side, an insulating plate 37 is secured to the side of the body 15 as indicated at 38 and carries a pair of conductor rings 39 and 40. An electric connection may be made between the motors 27 and the rings 39 and 40 through the medium of wires 41 and 42. Brushes 43 and 44 may be mounted in an insulation plate or block 45 held stationary at one side of the frame and may be suitably secured thereto or to one of the stationary gears 17 as indicated at 46. An electric current may be supplied to the brushes by feed or line wires 47 and 48 with an interposed switch 49 for controlling the same, so that when the circuit is closed, current will be supplied by the brushes to the annular contacts or conductors 39 and 40 as the latter revolve in contact with the brushes to supply the motors 27 with the necessary current to drive them. The armatures of the motors will thereby revolve and the pinions 30 will be driven to drive the pinions 31 and shafts 32 and thus the pinions 35 which thereby travel around the stationary tracks or gear wheels 17 causing revolution of the body 15 from which power may be transmitted as previously explained. Of course, one or more motors may be employed and should be mounted in the body 15 so as to properly balance the same. By reason of the motors driving the shafts 32, preferably at both sides or ends of the motors, a uniform driving effect will be produced so that one side will not tend to race or run ahead of the other or lag behind the other with resultant increase in friction, torque, binding, or loss of power and efficiency thereby enabling the machine to run more smoothly and evenly with more efficient results. In other words, the driving effect produced by the use of the auxiliary or countershafts 32 at both or opposite sides, is rendered uniform instead of uneven and the result will also be to increase the heft or weight of the body as a fly wheel or rotor to permit the same to be driven more steadily and uniformly with a small or lightweight electric motor to develop the full capacity of the motor or motors and the highest possible efficiency for the production of current, driving of machinery or otherwise.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim is new and desire to secure by Letters Patent is:

1. An electric machine of the class described comprising a revoluble body, stationary circular tracks, electric motors mounted within said revoluble body, gears mounted on opposite ends of the armature shafts of the motors, countershafts rotatably mounted in the body, gear wheels spaced apart on the countershafts and engaging the gear wheels of the motors, and gear wheels on the opposite ends of the countershafts, and engaging the circular tracks.

2. An electric machine of the class described comprising a revoluble body, electric motors mounted within said revoluble body, gears mounted on opposite ends of the armature shafts of the motors, countershafts rotatably mounted in the body, gear wheels on the countershafts engaging the gear wheels of the motors, gear wheels on the ends of the countershafts, a shaft rotatably supporting said revoluble body, gear wheels stationarily mounted and engaged by the last named gear wheels on the countershafts so that the latter will revolve therearound and means for transmitting power from the revoluble body or shaft thereof.

3. An electric machine of the character described including a frame having bearings, a shaft rotatable in the bearings, gear wheels fixed to the frame around the shaft, a hollow two part cylindrical body fixed to the shaft and having a web with enlargements provided with chambers, electric motors fixed in said chambers and having gear wheels on the ends of the armature shafts thereof, countershafts transversely of the body within the motors, gear wheels on the countershafts meshing with the second gear wheels, the ends of the countershafts projecting outwardly of the sides of the body and having gear wheels thereon meshing with the stationary gears, annular contacts carried by and insulated from the body to rotate therewith, stationary brushes engaging said contacts and insulated from the stationary gears and frame, and current conductors connected to the brushes.

4. In an electric machine, a rotary body comprising sections having coacting cavities forming a chamber, a shaft keyed to the body, a frame having side bearings for the shaft, an electric motor held in the chamber and having its armature shaft within the body, a pinion on the armature shaft, a countershaft having bearings in the body and projecting outwardly thereof, a pinion on the countershaft meshing with the first pinion, a gear secured to the frame at one side of the body, a pinion on the countershaft outwardly of the body and meshing with the gear, contact rings mounted on one side of the body and insulated therefrom, electrical connections between the rings and motor, brushes fixed outwardly of the rings and engaging the same, and lead wires connected to the brushes.

5. In a multiple motor electric machine, a rotary cylinder having closed sides and a hub, a radial web in the cylinder, said cylinder comprising two semi-cylindrical sections secured together, chambers in the web extending into each section of the web, an electric motor mounted in each chamber and having its shaft projecting from the web at each side within the cylinder, pinions fixed to the shaft ends, auxiliary shafts bearing in the web and sides of the cylinder inwardly of the motors and projecting outwardly of the cylinder sides, pinions fixed on the auxiliary shafts within the cylinder and meshing with the aforesaid pinions, pinions fixed on the outer ends of the auxiliary shafts, a frame having side bearings, a shaft keyed to the hub of the cylinder and journaled in the bearings, gears fixed to the side bearings and meshing with the last mentioned pinions outwardly of the cylinder, insulated contact rings mounted on one side of the cylinder and electrically connected to the motors, insulated brushes mounted adjacent a gear at one side bearing, each to engage a ring, and a current supply connected to the brushes, said shaft keyed to the hub of the cylinder constituting power take-off means.

WILLIAM FARRELL.